March 1, 1966    M. J. FOWLE ETAL    3,237,767
METHOD AND APPARATUS FOR THE SEPARATION OF SOLIDS
Filed March 26, 1962

MERRILL J. FOWLE
HENRY R. GRANE
OSCAR H. HARIU
JOHN C. JUBIN, JR.
INVENTORS

BY Michael J. Frimer
ATTORNEY 3,237,767
METHOD AND APPARATUS FOR THE
SEPARATION OF SOLIDS
Merrill J. Fowle, Newton Square, and Henry R. Grane, Springfield, Pa., Oscar H. Harin, Cleveland, Ohio, and John C. Jubin, Jr., Wallingford, Pa., assignors to The Atlantic Refining Company, Philadelphia, Pa., a corporation of Pennsylvania
Filed Mar. 26, 1962, Ser. No. 182,260
5 Claims. (Cl. 209—160)

This invention relates to a method of and apparatus for separating the particles of two solids, which particles have different settling rates in liquid media. More particularly, it relates to a method and apparatus for utilizing an ascending liquid stream to separate the particles of two solids which particles have different settling rates in liquid media, the particles of the solids being contained as a mixture in a liquid slurry. In a specific embodiment, the invention relates to a method of and apparatus for separating particles of solid oxide catalysts and catalyst carriers from particles of an ion exchange resin.

Numerous methods and devices have been proposed for the separation of the particles of two solids when the particles of one of the solids have a different settling rate in a liquid from the settling rate of the particles of the other solid in the same liquid. For example, elutriation methods and devices have been proposed, all of which are based on the principle of the difference in settling rate relative to a fluid or liquid medium of particles which differ in particle size, particle density, or a combination of particle size and density. Many elutriation devices and methods have been proposed utilizing ascending streams of water or other liquids to effect the separation of the particles of one solid from the particles of another solid, but these have had either poor separation efficiencies or very low capacities or required extremely critical control of feed and water flow rates.

There now has been found an elutriation method and apparatus which not only gives separation efficiencies of 99 percent or higher, but which method is readily controllable and which apparatus can be built to separate commercial quantities of solids economically.

It is an object of this invention to provide an elutriation method and apparattus for separating the particles of one solid from the particles of another solid when the particles of the first solid have different settling rates in liquid media from the settling rates of the particles of the other solid in the same liquid media, which method and apparatus have a high efficiency and capacity and can be easily controlled and constructed.

Other objects of the invention will be apparent from the description and claims that follow.

In accordance with this invention, a liquid slurry comprising a mixture of the particles of two solids is utilized as the feed material for separation. In order for the separation to occur it is necessary that the particles of the first solid have a different settling rate from the settling rate of the particles of the second solid when the particles are placed in any particular liquid medium. This difference in settling rate of the particles of one solid from the settling rate of the particles of the other solid may be caused by difference in particle size, difference in particle density or a difference in a combination of particle size and density. Thus, for example, if the particles of the first solid have the same density as the particles of the second solid but are larger in particle size, they will have a faster settling rate, likewise, if the particles of the first solid are the same size as the particles of the second solid but have a greater density, they will have a faster settling rate in a liquid medium. It is equally possible, however, for the particles of the first solid to have a density less than that of the particles of the second solid but have a particle size sufficiently larger such that their settling rate will be faster than the settling rate of the particles of the second solid.

The liquid slurry feed comprising the mixture of the particles of the two solids is introduced into an upper column section through an internal pipe concentric with the column and having its outlet near the bottom of this column section. The liquid slurry leaving the pipe impinges on an imperforate or target section of a perforated distributing plate so that it is dispersed into the upwardly flowing stream of liquid which fills the column. The velocity of the upwardly flowing liquid stream is controlled to cause the particles of the solid which have the slower settling rate to be carried upwardly with the liquid stream and the particles of the solid which have the faster settling rate to settle through the holes in the perforated distributing plate downwardly through a frusto-conical section into a lower column section both of which are filled with liquid which is moving upwardly at substantially the same velocity as the liquid in the upper column section.

This separation of the particles of the solids is accomplished by controlling the velocity of the ascending liquid stream to exceed the settling rate of the particles of the solid which have the slower settling rate and thus, these particles will be carried upwardly, while the particles of the solid which have the faster settling rate are caused to settle since the velocity of the ascending liquid stream is less than the settling rate of these faster settling particles. It will be understood that the individual particles of each solid may differ slightly from each other in size or density and hence will differ slightly in their individual settling rates therefore, in order to effect separation it is necessary that the velocity of the ascending liquid stream be greater in an upward direction than the settling velocity of the fastest settling particles of those particles of the solid which have the slower settling rate, and in the same manner, the velocity of the ascending liquid stream should not exceed the velocity of the slowest settling particles of the particles of the solid which have the faster settling rate.

The liquid moving upwardly in the lower column section is introduced into the bottom of such section at a rate sufficient to provide the aforesaid desired upward velocity of liquid in the column. A liquid slurry of the particles which have the slower settling rate is withdrawn from the top of the upper column section and a liquid slurry of the particles of the solid which have the faster settling rate is withdrawn from the bottom of the lower column section.

The method and apparatus will be further described by reference to the drawings.

Figure 1:
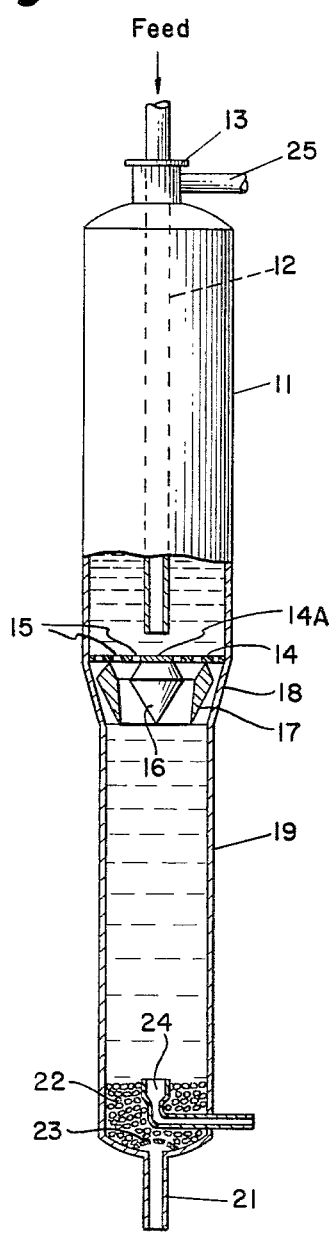
FIGURE 1 represents an elevational view of the elutriator with all but a portion of the upper column shown in section.

In FIGURE 1 the apparatus shown includes the upper column section 11 of the elutriator into which the liquid slurry feed is introduced by means of internal pipe 12 which projects out of the top of the upper column section through a manhead 13 and is concentric with the upper column section. The liquid slurry feed is directed downwardly from the outlet of internal pipe 12 so that it impinges against the imperforate target portion 14A of the perforated distributing plate 14 and thus is dispersed into the upwardly flowing liquid which fills column 11. The velocity of the upwardly flowing liquid stream is controlled as has been described to cause the particles of the solid which have the slower settling rate to be carried upwardly with the liquid stream and the particles of the solid which have the faster settling rate to settle through holes 15 in the perforated distributing plate 14.

Figure 2:
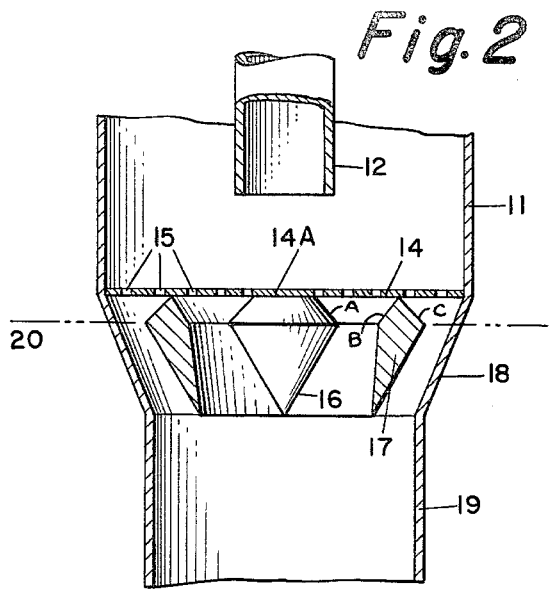
FIGURE 2 is a sectional view showing the internal cone and ring within the frusto-conical portion of the tower and the perforated distributing plate separating the upper column section and the frusto-conical section.

Referring not to FIGURE 2, cone 16 and ring 17 are located immediately below perforated distributing plate 14 and within frusto-conical section 18 which connects the upper column section with the lower column section 19. Cone 16 and ring 17 are held in place by conventional supporting members not shown. The cone and ring are of such shape that the sum of the cross-sectional areas of the annular spaces between them and between the ring 17 and the inner wall of frusto-conical section 18 is substantially equal to the cross-sectional area of the lower column section over the distance from their lower apexes located at the juncture of the lower column section and the frusto-conical section to a horizontal plane slightly below the perforated distributing plate 14. The horizontal plane is designated 20 on cone 16 and ring 17. The distance from horizontal plane 20 on cone 16 and ring 17 to the bottom of the perforated plate is minimized as much as possible since in this distance the sum of the cross-sectional areas of the annular spaces between cone 16 and ring 17 and between ring 17 and frusto-conical section 18 increases from horizontal plane 20 to the bottom of plate 14 so that there will be a decrease in the velocity of the upwardly flowing liquid stream until plate 14 is reached. This distance should be sufficiently large, however, such that the angles "A" in the cone 16 and "B" and "C" in the ring 17 are greater than about 50° (with the horizontal) since otherwise solids will tend to build up on the projections formed by the angular configurations.

The number and size of the holes 15 in plate 14 are such that the sum of their cross-sectional areas is substantially equal to the cross-sectional area of lower column section 19. Thus, since the cross-sectional area of the lower column section 19 is maintained substantially the same through the frusto-conical section to the top of plate 14 by means of cone 16 and ring 17 and the cross-sectional area of holes 15, the velocity of the ascending stream of liquid in lower column section 19 is maintained substantially constant through frusto-conical section 18 and plate 14.

The internal diameter of the upper column section 11 is large enough so that the annular space between internal pipe 12 and the inner wall of column 11 will provide a sufficiently large cross-sectional area such that the volume of liquid passing upwardly through plate 14 together with the volume of liquid entering through pipe 12 will continue upwardly at a velocity substantially the same as that in lower column 19. Thus, there is maintained throughout the entire length of the tower a substantially constant upward liquid velocity. In this manner the entire height of the tower is employed as an elutriator.

The solids concentration in the tower must be such that the individual particles have settling characteristics according to Stokes law, i.e. the solids should not be so concentrated that the particles physically interact with each other to the extent that they markedly interfere with and affect their settling characteristics. It has been found that the concentration of solids introduced into the elutriator through internal pipe 12 should not exceed about 15 weight percent of the liquid slurry so that when these solids become dispersed in the liquid of the tower, their concentration will fall to no more than about 4.5 percent by weight. Slurries having concentrations ranging up to 15 weight percent of solids can be separated most efficiently, however, for practical reasons it is preferred that the slurry contain at least about one weight percent of solids. If the solids concentration of the liquid slurry to be treated is higher than about 15 weight percent, it is necessary to pre-dilute the feed before it is introduced through internal pipe 12 into the elutriator. When the solids concentration of the liquid slurry feed is reduced by predilution, there will be a greater tolerance in the feed rate to the elutriator since, with a diluted feed, local over-concentration of solids in the elutriator can be avoided even with surges in the feed rate.

Figure 3:
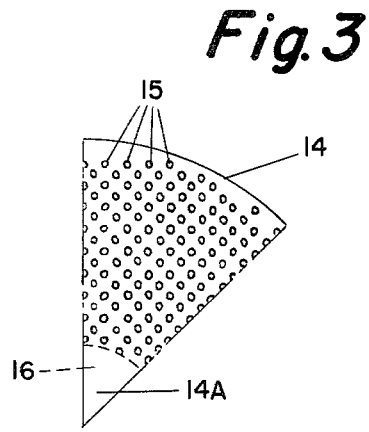
FIGURE 3 is a plan view of a sector of the perforated distributing plate. The sector shown represents one-eighth of the total plate.

Referring now to FIGURE 3, it will be seen that the center portion of perforated distributing plate 14 is solid or imperforate. This center portion which has been designated 14A is located immediately below the bottom end of internal pipe 12 and above cone section 16. It has been found that this section which is imperforate should have a diameter sufficiently great such that the liquid slurry flowing out of the bottom of pipe 12 will impinge on it rather than spread out and bypass the target section 14A thereby being discharged downwardly through the holes 15 in plate 14. This may be accomplished by adjusting the relationship between the diameter of pipe 12, the diameter of target section 14A of perforated distributing plate 14 and the distance from the bottom of pipe 12 to the target section 14A.

In general, the target section 14A of the plate 14 should have a diameter of 1½ to 2 times the diameter of pipe 12. The distance between the lower end of pipe 12 and the target plate also is a factor in insuring that the feed stream impinges against the target section. For example, if the velocity of the liquid slurry entering through pipe 12 is 2 feet per second, a distance between the bottom of the pipe 12 and the target section 14A should be about 1½ times the diameter of pipe 12. If the distance between the outlet pipe 12 and the target section 14A is too short, the feed stream will be subjected to violent turbulent above plate 14 which will prevent clean separation of the particles. If the distance is too great, the feed stream jet will so expand in cross-sectional area that its outer portion will miss the target section 14A and instead will enter holes 15 directly. It has been found quite necessary that this impingement occur in order that the downward direction of the incoming particles be changed and the particles dispersed into the ascending liquid stream. The particles, after impingement, will be given a horizontal or sidewise motion and therefore the holes 15 in the perforated plate 14 should be large enough to permit the particles of the solid which have the faster settling rate to traverse a trajectory which will carry them horizontally and downwardly through the holes in the plate. Each hole, therefore, acts as an individual elutriator and, consequently, the holes must be considerably larger than the largest particles.

Holes having diameters ranging from one to two inches are convenient although the diameter of the holes has not been found to be extremely critical provided their total cross-sectional area is substantially equal to the cross-sectional area of the lower column section and there is a sufficiently large number of them to permit uniform flow of liquid and particles through the plate.

Referring again to FIGURE 1, the velocity of flow in the lower column section is adjusted by controlling the amount of liquid introduced through pipe 21 located at the bottom of column section 19 in addition to the volume removed through pipe 24. The entering liquid is distributed uniformly across the entire cross-section of the lower column section 19 by means of a bed of granules or spheres 22. These granules may be gravel or the spheres may be stainless steel, alumina or similar material but, irrespective of the material, it should be graded uniformly in size to permit proper packing. The smallest spheres should be of a size depending on their density so that they remain in a fixed location when acting to distribute the liquid. For example, when distributing water at a rate of four feet per minute velocity in the tower, an alumina sphere should not be smaller than ¼ inch in diameter. These granules or spheres are held away from the opening of pipe 21 by means of a suitable screen or grate 23. The particles of the solid which have the faster settling rate which settle through holes 15 in plate 14 and through the annular spaces between cone 16 and ring 17 and between ring 17 and the wall of frusto-conical section 18 down through column section 19 are removed as a liquid slurry from the bottom of the tower as fast as they settle by means of pipe 24, the opening of which is at a level slightly above the level of the granules or spheres 22. That portion of the liquid entering the tower which is not used to remove the faster settling particles is removed from the top of the upper column section 11 by means of pipe 25 and carries the particles of the solid which have the slower settling rate.

The instant invention possesses numerous advantages for elutriation not heretofore realized. Mixtures may be separated wherein the particles of one of the solids constitute only a few percent of the total, for example, mixtures may be separated where one of the solids amounts to only one or two percent and the other solid 98 to 99 percent of the total solids. By controlling the concentration of the liquid slurry entering the tower, local over-concentration of solids which would markedly interfere with the separation of the solids by elutriation due to physical interaction between the particles is prevented and thereby there is obtained a high efficiency of separation. The rate of total liquid input into the tower is easily controlled by controlling the rate of input at the bottom of the tower by pipe 21 and the feed through pipe 12. Thus, this rate can be maintained constant with little difficulty. The use of a frusto-conical section, cone and ring, together with a perforated distributing plate the holes of which have a total cross-sectional area substantially equal to the cross-sectional area of the lower column permits a substantially constant upwardly flowing velocity of liquid throughout the entire height of a large scale tower and, thus the entire height of such a tower can be utilized for elutriation. The geometry of the internal pipe and the target section may be adjusted so that the feed stream impinges on the target section and thereby changes the direction of flow of particles. The particles are quickly dispersed into the ascending liquid stream which rises through the perforated plate. Each of the perforations of the plate behaves as a small elutriation column and thereby a highly efficient separation is achieved at the point of entrance of the solids into the column. Thus, the upper column section, the frusto-conical section and the lower column section can function as final stripping sections to complete the elutriation separation of the particles. In the upper column section this is simply the separation of a small quantity of the faster settling particles from the very large quantity of the slower settling particles whereas in the frusto-conical section and the lower column section the reverse is true, namely, there is a separation of the smaller quantity of the slower settling particles which may have been entrained with the faster settling particles of their descent through the plate. The particles which settle in the lower column can be removed in the form of a slurry as fast as they settle, thereby preventing build-up of particles and obtaining full use of the lower column section for elutriation.

The most readily available liquid for elutriation is, of course, water. However, it will be understood that other liquids or solutions of higher or lower density may be utilized for elutriation depending upon the type of solids to be separated. In all cases, of course, the elutriation liquid should be inert with respect to the solids being separated.

It is known that solid oxide catalysts such as silica-alumina hydrocarbon cracking catalysts become contaminated with metal contaminants during use. These metal contaminants when deposited on the silica-alumina catalyst change the product distribution characteristics of the catalyst and thus, instead of converting the hydrocarbon charge into desired gasoline boiling range and furnace oil boiling range products, the catalyst produces relatively large quantities of normally gaseous hydrocarbons and coke with a consequent loss of the desired products. In certain catalytic reforming processes employing as the catalyst platinum deposited on a solid oxide carrier such as alumina, it was found that the stability and life of the catalyst was deleteriously affected if certain cationic impurities such as sodium, or anionic impurities such as the halogens, were not removed from the alumina carrier prior to platinization.

Numerous methods have been proposed for the removal of such impurities from solid oxide catalysts or catalyst carriers. One of the most recent developments involves the use of ion exchange resins. In these latter methods, the solid oxide catalysts or catalyst carrier in finely-divided form is slurried in an aqueous medium and the particles are contacted with particles of an ion exchange resin whereby the impurities are transferred from the solid oxide to the ion exchange resin. When the impurities are in the form of metals, i.e., cationic, a cationic exchange resin is employed, whereas if the impurities are anionic, an anionic exchange resin is utilized. After the contacting step, in order to obtain the purified catalyst or catalyst carrier, it is necessary to separate the resin particles from the solid oxide particles. The method and apparatus of the instant invention have been found to be particularly suitable for making this separation.

In general, the particles of the solid oxide catalyst or catalyst carrier will range in diameter from about 20 microns to about 150 microns with a few particles ranging up to 200 to 300 microns in diameter. The ion exchange resin particles utilized range from about 400 microns to about 2,000 microns in diameter. It has been found that the velocity of the stream of water used for elutriation should range from about two feet per minute to about eight feet per minute, depending upon the temperature of the water employed for elutriation. Particularly good results have been obtained using water at 150° F. and four feet per minute upward velocity. The results which are obtained utilizing the method and apparatus of the instant invention in such a process are shown in the following example.

*Example*

An aqueous slurry comprising a mixture of particles of commercial silica-alumina cracking catalyst which had been used in the cracking of hydrocarbons in a commercial cracking plant which particles ranged in size from 20 microns to 300 microns and commercial cation exchange resin particles ranging in size from 400 microns to 2000 microns (Permutit-Q, a sulfonated copolymer of styrene and divinyl benzene) was introduced into a commercial plant scale elutriation tower constructed and operated in accordance with this invention. The ratio of catalyst to resin was 465 grams of catalyst per 1000 cc. of wet resin and the aqueous slurry introduced into the elutriator had a concentration of about 4.9 weight percent solids. The temperature of the water introduced into the bottom of the tower and that of the slurry feed mixture was 150° F. An upward velocity of water of four feet per minute was maintained in all sections of the tower. In a test run it was found that only 0.24 cc. of resin of particle size larger than 400 microns per 1000 grams of catalyst was carried overhead and 1.54 grams of catalyst per 1000 cc. of resin was entrained with the resin removed from the bottom of the tower. Thus, about 99.7 percent of the catalyst was separated from the resin with negligible resin carry-over.

We claim:

1. The method of separating the particles of two solids, said particles having different settling rates in liquid media and being contained as a mixture in a liquid slurry having a total solids concentration in the range from about one weight percent to fifteen weight percent, which comprises introducing a liquid medium into a lower columnar zone to form an ascending liquid stream passing successively through said zone, a frusto-conical zone and an upper columnar zone, introducing said slurry mixture downwardly into said upper columnar zone at a locus adjacent the juncture of said upper columnar zone and said frusto-conical zone at a rate sufficient to provide substantially the same ascending velocity of liquid in said upper columnar zone as in said lower columnar zone, imparting a substantially horizontal motion to said particles thereby causing them to disperse into said ascending liquid stream in said upper columnar zone, controlling the upward velocity of said ascending liquid stream to cause the particles having the slower settling rate to move upwardly and the particles having the faster settling rate to settle into said lower columnar zone through said frusto-conical zone wherein the velocity of said ascending liquid stream is maintained substantially the same substantially through said zone as that in said upper and lower columnar zones, withdrawing a slurry of particles having a faster settling rate from said lower columnar zone and withdrawing a slurry of the particles having the slower settling rate from said upper columnar zone.

2. The method of separating the particles of solid oxide catalysts and solid oxide catalyst carriers from admixture with particles of an ion exchange resin in an aqueous slurry having a total solids concentration in the range of about one weight percent to about fifteen weight percent which comprises introducing water into a lower columnar zone to form an ascending aqueous stream passing successively through said zone, a frusto-conical zone and an upper columnar zone, introducing said aqueous slurry of particles into said upper columnar zone at a locus adjacent the juncture of said upper columnar zone and said frusto-conical zone at a rate sufficient to provide substantially the same ascending velocity of liquid in said upper columnar zone as in said lower columnar zone, imparting a substantially horizontal motion to said particles thereby causing them to disperse into said ascending aqueous stream in said upper columnar zone, controlling the upward velocity of said ascending aqueous stream to cause the solid oxide particles to move upwardly and the ion exchange particles to settle into said lower columnar zone through said frusto-conical zone wherein the velocity of said ascending aqueous stream is maintained the same substantially through said zone as that in said upper and lower columnar zones, withdrawing a slurry of ion exchange particles from said lower columnar zone and withdrawing a slurry of solid oxide particles from said upper columnar zone.

3. The method of separating the particles of solid oxide catalysts and solid oxide catalyst carriers from admixture with particles of an ion exchange resin in an aqueous slurry having a total solids concentration in the range of about one weight percent to about fifteen weight percent which comprises introducing water into a lower columnar zone to form an ascending aqueous stream passing successively through said zone, a frusto-conical zone and an upper columnar zone, introducing said aqueous slurry of particles into said upper columnar zone at a locus adjacent the juncture of said upper columnar zone and said frusto-conical zone at a rate sufficient to provide substantially the same ascending velocity of liquid in said upper columnar zone as in said lower columnar zone, imparting a substantially horizontal motion to said particles thereby causing them to disperse into said ascending aqueous stream in said upper columnar zone, controlling the upward velocity of said ascending aqueous stream within the range of from two feet per minute to eight feet per minute thereby causing the solid oxide particles to move upwardly and the ion exchange particles to settle into said lower columnar zone through said frusto-conical zone wherein the velocity of said ascending aqueous stream is maintained substantially the same substantially through said zone as that in said upper and lower columnar zones, withdrawing a slurry of ion exchange particles from said lower columnar zone and withdrawing a slurry of solid oxide particles from said upper columnar zones, withdrawing a slurry of ion exchange particles from said lower columnar zone and withdrawing a slurry of solid oxide particles from said upper columnar zone.

4. Apparatus for separating the particles of two solids said particles having different settling rates in liquid media and having contained as a mixture in a liquid slurry, comprising in combination, a lower column section, and an upper column section of larger diameter than said lower column section, a frusto-conical section in communication with said upper and lower column sections, internal cone and ring means in said frusto-conical section to provide a cross sectional area substantially through said section substantially equal to the cross-sectional area of said lower column section, a distributing plate having a target section and provided with holes having a total cross-sectional area substantially equal to the cross-sectional area of said lower column section, said distributing plate separating said upper column section from said frusto-conical section, means for internally introducing said slurry material into said upper column section, said means extending from the top of said upper column section substantially the entire length of said upper column section and terminating at a locus adjacent said target section, means for introducing a liquid medium into the bottom of said lower column section, means for withdrawing a liquid slurry of the particles having the faster settling rate from said lower column section and means for withdrawing a liquid slurry of the particles having the slower settling rate from said upper column section.

5. In an apparatus for the separation of the particles of two solids said particles having different settling rates in liquid media, said apparatus having a lower column section, an upper column section of larger diameter than said lower column section and a frusto-conical section in communication with said upper and lower column sections, the combination of a distributing plate at the juncture of said upper column section and said frusto-conical section, said plate having a target section and provided with holes having a total cross-sectional area substantially equal to the cross-sectional area of said lower column section and an internal cone means and an internal ring means in said frusto-conical section to provide a cross-sectional area substantially through said frusto-conical section substantially equal to the cross sectional area of said lower column section.

References Cited by the Examiner
FOREIGN PATENTS
22,217  1895  Great Britain.

HARRY B. THORNTON, *Primary Examiner.*

HERBERT L. MARTIN, *Examiner.*